United States Patent [19]
Gabor

[11] 4,446,560
[45] May 1, 1984

[54] HIGH POWER ELECTRIC GENERATOR, ESPECIALLY ADAPTED FOR POWERING PROCESSES INVOLVING DISCHARGE IN A RARIFIED ATMOSPHERE

[75] Inventor: Gabriel Gabor, La Celle Saint Cloud, France

[73] Assignee: Jean Frager, France

[21] Appl. No.: 331,207

[22] Filed: Dec. 16, 1981

[30] Foreign Application Priority Data

Dec. 19, 1980 [FR] France ............................ 80 27017

[51] Int. Cl.³ ...................... H05H 1/24; H02P 13/22
[52] U.S. Cl. ................................. 373/25; 219/121 PT; 363/28; 363/79
[58] Field of Search ...................... 363/20, 21, 26, 27, 363/28; 373/25, 18; 219/121 PT, 121 PW

[56] References Cited

U.S. PATENT DOCUMENTS

| | | | |
|---|---|---|---|
| 3,562,623 | 2/1971 | Farnsworth | 363/20 |
| 3,697,853 | 10/1972 | Nowell et al. | 363/28 |
| 3,914,575 | 10/1975 | Eichler | 219/121 PW |
| 4,195,333 | 3/1980 | Hedel | 363/21 |

FOREIGN PATENT DOCUMENTS

2445093  1/1976  Fed. Rep. of Germany ........ 363/21

OTHER PUBLICATIONS

Review of The Electrical Communication Laboratories, vol. 22, No. 9, pp. 818-826, (Japan), Sep./Oct. 1974.

*Primary Examiner*—William H. Beha, Jr.
*Attorney, Agent, or Firm*—Scully, Scott, Murphy & Presser

[57] ABSTRACT

A high power generator for an ion discharge device used for the thermal treatment of metals in a rarified gaseous atmosphere. A variable width pulse generator is used to vary the input power to an inductance means. The frequency of the input pulses is held constant, while the pulse width is varied. An arc protection circuit is provided to sense and prevent an incipient arc across the secondary of the transformer. The arc protection circuit includes a voltage detector and a current detector with logic means to sense an under voltage-over current condition that presages the beginning of an arc. A second embodiment is disclosed which uses two circuits in parallel to drive the ion generator. One circuit is charged while the other is discharged. A third embodiment is disclosed which was a thyristor network for selectively loading the primary circuits of a pair of inductance circuits in response to an inductance-capacitance time constant.

6 Claims, 4 Drawing Figures

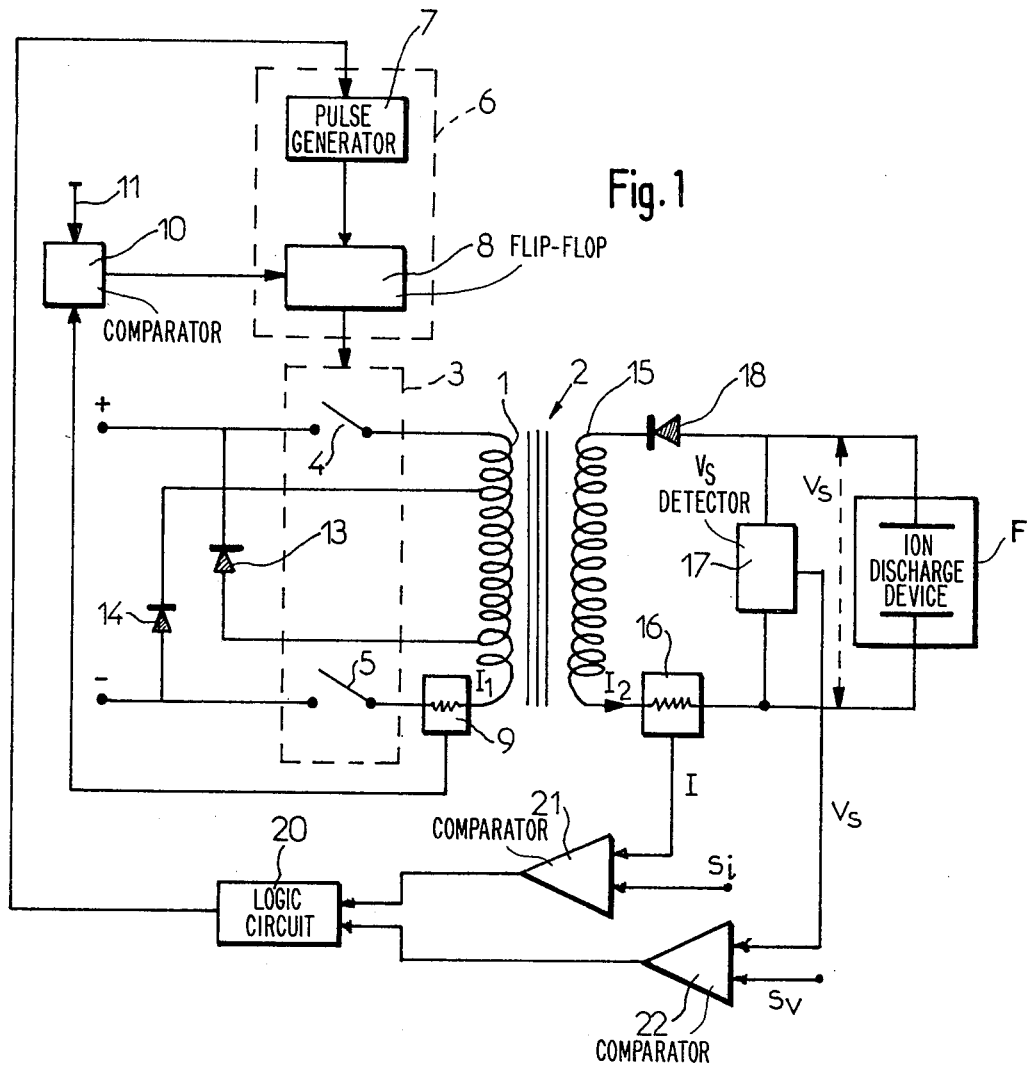

HIGH POWER ELECTRIC GENERATOR, ESPECIALLY ADAPTED FOR POWERING PROCESSES INVOLVING DISCHARGE IN A RARIFIED ATMOSPHERE

The present invention concerns a high power electric generator, especially but not exclusively for powering of processes involving a discharge in a rarified gaseous atmosphere.

More particularly, the invention's aim is the realization of a generator, the internal impedance of which is suited to the gaseous plasma resulting from the aforesaid discharge, which reacts quickly to excessive power demands caused, for example, by the formation of an arc.

To reach this result, the invention proposes a generator comprising a supply device which transmits a rectified electrical current pulse at a constant frequency and at variable pulse amplitudes or widths, to the primary circuit of an induction coil or transformer, the secondary circuit of which is connected to a receiver, such as a discharge device in a gaseous medium, and a regulating circuit controlling the amplitude or width of each of the aforesaid pulses by interrupting the pulse when the amplitude of the current in the primary circuit becomes equal to that of a reference signal.

Therefore, one such generator allows each of the pulses to have the energy required by the receiver in terms of its needs and of its following restoration to the receiver.

In effect, if one establishes at the terminals of an induction coil a difference of potential Ve, the current i circulating in the induction coil rises according to a linear law:

$$i = (V_e \cdot t / L)$$

in which:

Ve is the value of the rectified voltage applied to the self-induction coil;

L is the coefficient of self-induction of the induction coil.

Thus, during the entire time current is conducting through the induction coil, an energy W is being stored equal to $\frac{1}{2}(LI_f)^2$, with $I_f$ being the final value of the current at the time the current is terminated, which depends upon the time t or the voltage Ve (if t is constant). Therefore, the stored energy is regulated by controlling the time t or the voltage Ve.

At the moment the current is interrupted (at the end of pulses from a pulse supply circuit), the stored energy is transmitted with the desired polarity to the receiver.

Therefore, the advantage of this system resides in the fact that for a fixed power corresponding, for example, to a particular type of treatment, whatever the voltage should be because of the nature of the receiver, for example, of the plasma, the generator automatically furnishes the required power.

It is clear from the fact that the regulation is carried out at a constant power that the generator permits, at the output of the secondary of the induction coil, some variations in amplitude in inverse proportion to variations of the voltage.

Therefore, this device comprises a device which detects the electricity in the secondary of the induction coil, a component part which measures the voltage at the terminals of this induction coil, and a logic circuit which interrupts the generation of the pulses, in the event the amplitude of the current exceeds a predetermined threshold and simultaneously therewith the voltage falls below a predetermined threshold.

According to an advantageous embodiment of the invention, the aforesaid supply device comprises a continous current generator connected to the primary of the induction coil or transformer through a switching device controlled by a pulse generator generating variable pulse amplitudes or widths.

In one case two switching circuits function in opposition when controlled by the same pulse generator, in a manner such that one of the induction coils discharges its energy, while the other is being charged (operating alternately). DR Some embodiments of the invention will be described hereafter, as nonlimiting examples, with reference to the attached drawings in which:

FIG. 1 is an electrical diagram of a single inductor or transformer generator;

FIG. 2 represents a table of the logic employed in the circuit of the generator represented in FIG. 1; notably for preventing arcing;

Figure 3:
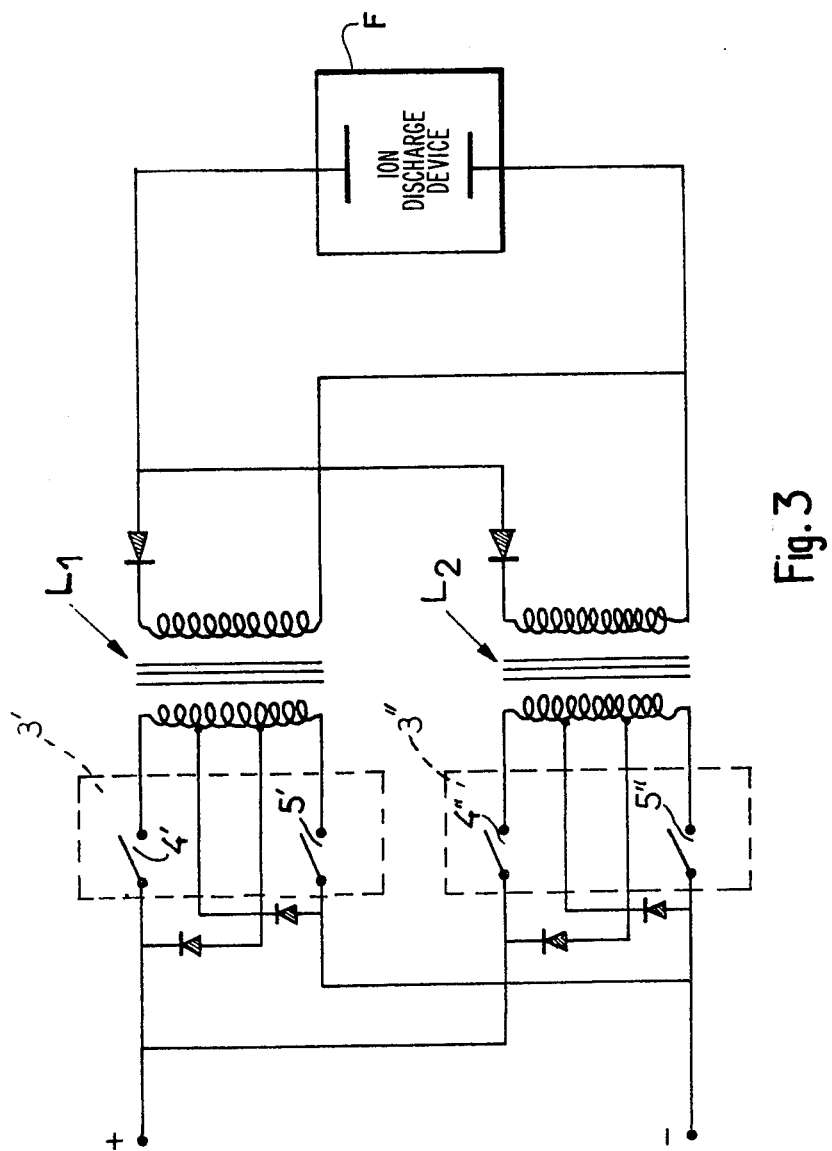
FIG. 3 is a diagram of a double transformer generator.

With reference to FIG. 1, the generator comprises a continuous current source, the output terminals (+), (−) of which are shown.

These terminals are connected to the primary coil 1 of a transformer 2 through a switching device 3 (having switches 4, 5 arranged in series) controlled by a pulse generator 6 comprising a constant frequency timing circuit 7 connected to a flip-flop 8, the state of which is controllable.

In the primary circuit of induction coil or transformer 2 is arranged a detector 9 furnishing a signal representative of the amplitude of current $I_1$ to a comparator 10. Comparator 10 compares this signal from detector 9 with the amplitude of an adjustable reference signal 11, and transmits a signal to flip-flop 8 when the amplitude of signal $I_1$ exceeds that of the reference signal 11.

Thus, upon the generation of a pulse from timing device 7, flip-flop 8 changes its state to cause the closure of switches 4 and 5. It maintains itself in this new state until the magnitude of current $I_1$ detected by detector 9 exceeds the magnitude of reference signal 11. When this occurs, comparator 10 generates a signal which returns flip-flop 8 to its initial state, and, in consequence, opens switches 4, 5. This operation is repeated with each pulse from the timing circuit 7.

One will note that each of the switches 4, 5 is shunted in a classical manner by a protection diode 13, 14 which also permits restoration to the source of the excess energy.

As previously mentioned, the secondary coil 15 of the transformer 2 is connected to the terminals of a discharge apparatus in a rarified atmosphere F, such as a furnace for thermal treatment by ionic bombardment, through a circuit comprising, in series, a current detector 16 for measuring the amplitude of the current $I_2$ and, in parallel, a voltage detector 17 for measuring the voltage $V_s$ at the terminals of secondary coil 15, a diode 18 connected in a opposite sense in the secondary circuit.

These two detectors 16, 17 are connected to a logic circuit 20 through two comparators, respectively 21, 22, which furnish a signal only when the voltage $V_s$ or the current $I_2$ exceeds predetermined thresholds $S_i$, $S_v$.

This logic circuit 20 blocks timing device 7 in the event the detected magnitude of $I_2$ exceeds threshold $S_i$ and the detected voltage $V_s$ is at a level below threshold $S_v$, which occurs particularly at the onset of an arc.

In the table of figures in FIG. 2, the number 0 indicates values of the voltage $V_s$ and of the current $I_2$ which are less than the corresponding values of threshold $S_i$ and $S_v$ and also the emission of a blocking signal from the logic circuit 20.

Conversely, the number 1 corresponds to values of $V_s$ and $I_2$ greater than their respective threshold values $S_v$ and $S_i$ and to the absence of a blocking signal from the logic circuit 20.

With reference to FIG. 3, the double transformer generator comprises two circuits (switching devices 3', 3'', transformers $L_1$, $L_2$) similar to those represented in FIG. 1, connected to a source of continuous current (having terminals +, −), and the outputs of which are connected to the input terminals of the discharge apparatus F according to the corresponding polarites.

In this case, the switches 4', 5', 4'', 5'' of the two switching circuits 3', 3'' are oppositely controlled by the same pulse generator (not shown).

Figure 4:
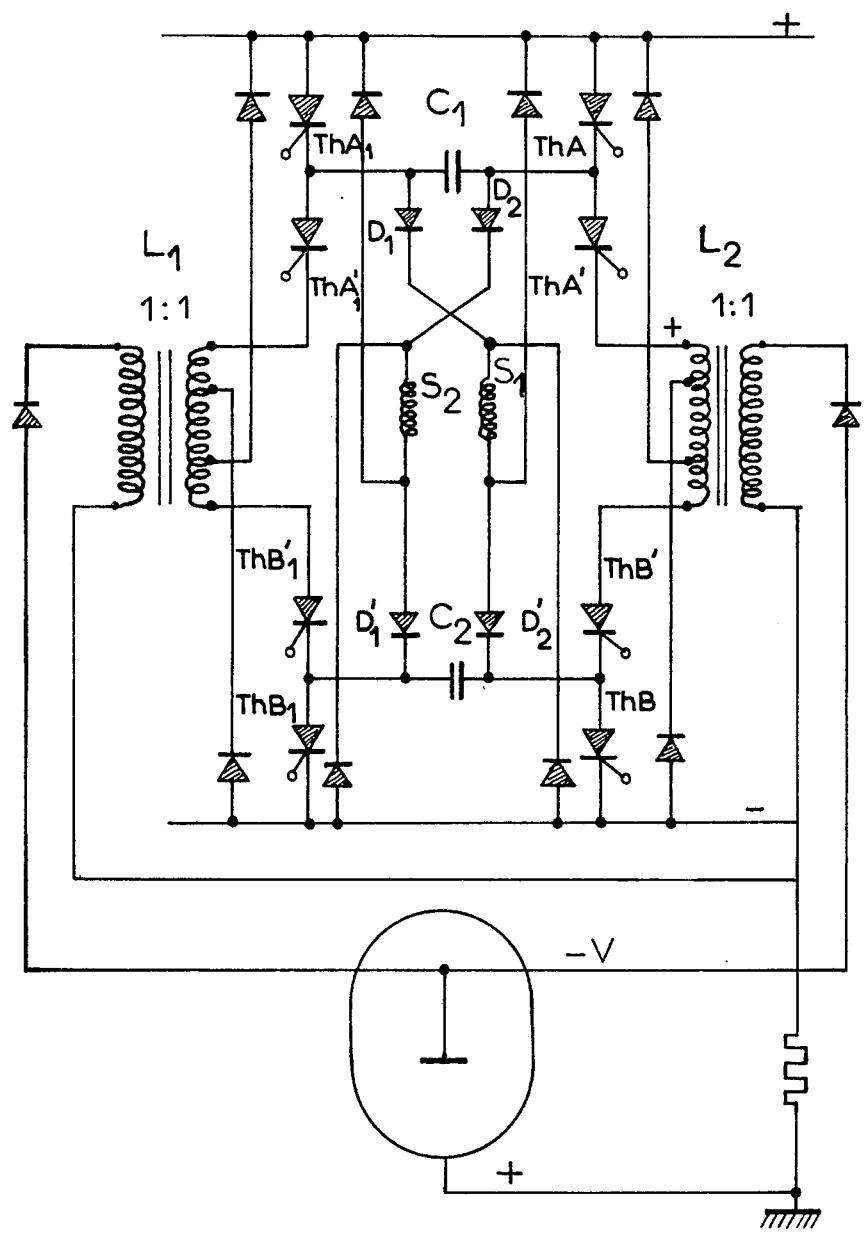
FIG. 4 is a diagram of a generator of the type represented in FIG. 3, utilizing thyristor technology.

In the electric generator shown in FIG. 4, the general principle of which is similar to that of the generator represented by FIG. 3, the switches 4', 5', and 4'', 5'' each consists of a pair of thyristors connected in series (ThA, ThA'), (ThB', ThB), (ThA$_1$, ThA'$_1$), and (ThB'$_1$, ThB$_1$).

Moreover, the connection between the thyristors (ThA$_1$, ThA'$_1$) is joined:

from one point, to the connection between the pair of thyristors (ThA, ThA') through a capacitor $C_1$, and from another part, to the connection between the pair of thyristors (ThB', ThB) through a circuit comprising, in series, a diode $D_1$, a self-inductor $S_1$, and a diode $D'_2$.

In an analogous fashion, the connection between the thyristors (ThB'$_1$, ThB$_1$) is joined:

from one part, to the connection between the pair of thyristors (ThB', ThB) through a capacitor $C_2$, and from another part, to the connection between the thyristors (ThA, ThA') through a circuit comprising, in series, a diode $D'_1$, a self-inductor $S_2$, and a diode $D_2$.

In a similar fashion to the preceding embodiment described, this circuit comprises protective diodes for the inductors $L_1$ and $L_2$ and, in the same manner, for the self-inductors $S_1$ and $S_2$.

The thyristors ThA, ThA', ThB', ThB and ThA$_1$, ThA'$_1$, ThB'$_1$, ThB$_1$ are controlled by means of a control circuit (not shown) functioning in the following manner:

Starting at an initial state in which none of the thyristors is conducting, a control pulse is directed to the gate electrodes of thyristors ThA, ThA', ThB', ThB which become conductive.

In consequence, the self-inductor $S_2$ conducts a current which produces:

From one part, charging of the capacitor $C_1$ caused by a circuit comprising, on the positive side, the thyristor ThA, and on the negative side, the thyristor ThB, the diode $D'_2$, the self-inductor $S_1$, and the diode $D_1$, and from another part, charging of the capacitor $C_2$ caused by a circuit comprising, on the positive side, the thyristor ThA, the diode $D_2$, the self-inductor $S_2$, and the diode $D'_1$, and on the negative side, the thyristor ThB. The self-inductors $S_1$ and $S_2$ are included to increase the charging time of capacitors $C_1$ and $C_2$ (decrease of di/dt).

Once the capacitors $C_1$, $C_2$ are charged, the circuit is then ready for the following switching, with the arrangement being such that the minimal conduction time of the thyristors ThA, ThA', ThB, ThB' must be sufficiently long such that the capacitors $C_1$, $C_2$ are sufficiently charged.

In order to terminate the current in the induction coil $L_2$, a control pulse is issued to the thyristors ThA$_1$ and ThB$_1$ which become conductive while blocking conduction of the thyristors ThA'$_1$ and ThB'$_1$.

This results in an inversion of polarity at the terminals of thyristors ThA and ThB and, in consequence, the blocking of conduction of these two thyristors.

Moreover, the capacitors $C_1$ and $C_2$ are charged, and will cause at the end of the charging the switching off of blocking of the thyristors ThA', ThB' and ThA$_1$, ThB$_1$.

Afterwards, a control pulse is issued to the thyristors ThA'$_1$, ThB'$_1$ and ThA$_1$, ThB$_1$ so as to render them conductive, thus circulating current in the induction coil $L_1$ during the desired duration, at the end of which a control pulse is directed to the thyristors ThA, ThB which, on becoming conductive, prevent conduction of the thyristors ThA$_1$, ThB$_1$. Once the thyristors ThA'$_1$, ThB'$_1$ and ThA, ThB are blocked by natural switching, a control pulse is directed to thyristors thA', ThB' and ThA, ThB which circulate current through the induction coil $L_2$ during the desired duration, at the end of which the cycle of operation can be repeated by causing switching of thyristors ThA$_1$, and ThB$_1$, and so forth.

It should be observed that in the context of weak power requirements, it is possible to simplify this circuit by using only the four thyristors situated on the same side as inductor coils $L_1$ and $L_2$, for example, thyristors ThA, ThA', ThA$_1$, ThA'$_1$, or alternatively the thyristors ThB, ThB', ThB$_1$, ThB'$_1$, with the switching principle remaining the same.

Moreover, in the generators previously described, it is also possible, for weak pulse amplitudes, to control the power of these generators by varying the frequency of the pulses. One such convenient operation, in particular, is for the phase of depassivation in a thermal treatment by ionic bombardment.

What is claimed:

1. A high power electric generator for high powered ion discharge into a rarified atmosphere, said generator comprising:
    (a) pulse generator means for generating a rectified current having a constant frequency and a variable pulse width,
    (b) an inductance means having a primary circuit for receiving said variable pulse width current and a secondary circuit connected across an ion discharge device used for treating materials in a rarified gaseous atmosphere,
    (c) a first control circuit for varying the pulse width of the rectified current by superseding the pulse generator,
    (d) arc protection means for preventing the formation of an arc in said discharge device, said means including a secondary voltage detector, a secondary current detector and means for terminating said rectified current in response to an over threshold current-under threshold voltage condition.

2. A high power generator as claimed in claim 1, wherein said pulse generator means further includes a continuous current generator which is connected to the primary circuit of said inductance means by a switch means, said switch means being driven by a pulse generator which may be selectively disabled by said first control circuit to provide variable width pulses.

3. A high power generator according to claim 1 or 2 which comprises two circuits connected in parallel, each comprising a switching circuit and an induction means, so that the two switching circuits function in opposition when controlled by the same pulse generator means, in a manner such that one of the induction means discharges its energy while the other is being charged.

4. A high power generator according to claim 3, characterized in that each of the switching circuits associated with an induction means also comprises first and second pairs of switches, with, each switch pair arranged respectively upstream from its aforesaid induction means.

5. A high power generator as claimed in claim 3, wherein said pulse generator comprises first and second sets of thyristors connected in series for switching the rectified current supplied to each of said inductance means.

6. A high power generator as claimed in claim 3, wherein said pulse generator further comprises first and second sets of thyristors connected between a continuous current source and said primary circuits of said inductance means, the junctions of the series connected sets of thyristors being cross connected by means of a pair of diode and capacitance-inductance circuits, and means for initiating a control pulse to open the gates of the first pair of thyristors.

* * * * *